2,870,196
METHOD OF PREPARING 2,3-DICARBO-METHOXY-1,3-BUTADIENE

Arthur L. Barney, Deerhurst, and Halsey B. Stevenson, McDaniel Heights, Del., assignors to E. I. du Pont de Nemours and Company, Wilmington, Del., a corporation of Delaware No Drawing. Application January 5, 1954
Serial No. 402,410
4 Claims. (Cl. 260—485)

This invention relates to a new dicarboxylic acid ester and to its polymerization products.

Of the theoretically possible dicarbalkoxy-1,3-butadienes, only those in which the carbalkoxy groups are attached to the 1- and 4-carbon atoms of 1,3-butadiene have been described in the literature. These compounds, the alkyl esters of muconic acid, have the general formula $ROCO-CH=CH-CH=CH-COOR$. These 1,4-dicarbalkoxy-1,3-butadienes are unsatisfactory for the production of technically useful polymers because they polymerize very sluggishly and the polymers are neither crystalline (orientable) materials nor have they elastic properties. Of the butadienes having carbalkoxy groups attached to the internal, rather than terminal, carbon atoms, the only known ones are the 2-monocarbalkoxy-1,3-butadienes (U. S. Patent 2,587,558). These compounds have little technical utility because of their extreme instability, evidenced by the fact that they dimerize at temperatures as low as 0° C.

This invention has as an object orientable polymers having elastic properties. A further object is the preparation of a stable monomer readily polymerizable to such polymers. Other objects will appear hereinafter.

These objects are accomplished by the present invention of the new monomeric product, 2,3-dicarbomethoxy-1,3-butadiene, i. e., the product having the formula

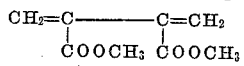

the polymers thereof, and a method for preparing the monomeric 2,3-dicarbomethoxy-1,3-butadiene wherein dimethyl 1-cyclohexene-1,2-dicarboxylate is pyrolyzed by passing the same through a reaction zone heated to a temperature within the range of 500° C. to 1000° C. Unexpectedly the new monomeric 2,3-dicarbomethoxy-butadiene is sufficiently stable to be handled and stored under normal conditions, yet is capable of polymerizing rapidly to give crystalline, orientable polymers.

The pyrolysis reaction is represented by the equation

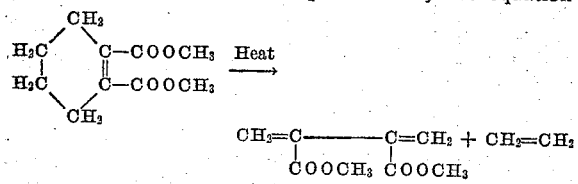

In addition to the principal pyrolysis products, viz., 2,3-dicarbomethoxy-1,3-butadiene and ethylene, there are usually formed, in amounts depending on the reaction conditions, some by-products, which are chiefly methyl benzoate and methyl cyclohexenecarboxylate.

The starting material, dimethyl 1-cyclohexene-1,2-dicarboxylate, can be prepared from 1,3-butadiene and maleic anhydride by the following series of reactions:

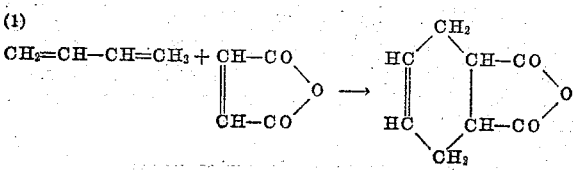

The first step is the well known Diels-Alder condensation of 1,3-butadiene with maleic anhydride [Diels and Alder, Ann., 460, 113 (1928); Cope and Herrick, Org. Syn., 30, 93 (1950)], leading to $\Delta_4$-tetrahydrophthalic anhydride (4-cyclohexene-1,2-dicarboxylic anhydride) in nearly quantitative yields.

The second step is the isomerization of $\Delta_4$-tetrahydrophthalic anhydride to $\Delta_1$-tetrahydrophthalic anhydride (1-cyclohexene-1,2-dicarboxylic anhydride). This is best carried out by heating the $\Delta_4$ isomer with 0.5–2% of its weight of a 10% palladium-on-carbon catalyst at 170–200° C. for 4–24 hours. In this manner, $\Delta_1$-tetrahydrophthalic anhydride is obtained in yields as high as 60%. It can be isolated by crystallization of the reaction mixture from a benzene-hexane mixture. The crude product often contains appreciable quantities of phthalic anhydride, a less soluble impurity which can be removed by vacuum distillation.

In the last step, dimethyl 1-cyclohexene-1,2-dicarboxylate is prepared by direct esterification of 1-cyclohexene-1,2-dicarboxylic anhydride with methanol using an esterification catalyst such as p-toluenesulfonic acid. Preferably, the reaction is carried to completion by one or two successive removals of methanol and water from the mixture at low temperature and pressure, followed by further treatment with additional anhydrous methanol. The catalyst is then neutralized with the calculated amount of dry sodium carbonate and the salt removed by filtration. The reaction product, which often contains some dimethyl phthalate, is fractionated to yield the pure dimethyl 1-cyclohexene-1,2-dicarboxylate. The esterification is nearly quantitative.

The pyrolysis of dimethyl 1-cyclohexene-1,2-dicarboxylate is conveniently carried out by passing its vapors through a tubular reactor connected to cooled receivers in which the condensable reaction products are liquefied, while the gaseous ethylene escapes and can be recovered in a suitable collecting device. The reactor can be constructed of any inert, heat-resistant material. For example, it can be made of quartz, heat-resistant glass, stainless steel, nickel or other inert metals. The reactor can, if desired, be packed with inert materials, such as granular quartz, quartz rings or glass beads, to provide better heat transfer within the reaction zone. The reaction zone can be heated by conventional means, for example, by electric heaters or by gas-fired heaters. A variation involves passing the vapors of dimethyl 1-cyclohexene-1,2-dicarboxylate over a hot resistance wire, such as a nickel-chromium wire. A stream of inert gas such as carbon dioxide or nitrogen can be used if desired to help the passage of the vapors of dimethyl 1-cyclohexene-1,2-dicarboxylate through the pyrolysis tube.

Below 500° C., pyrolysis does not take place at a practical rate, and above 1000° C. deep-seated decomposition tends to take place. Temperatures within the range of 500 to 1000° C. are suitable. It is of course desirable to adjust the temperature in relation to the contact time, that is, the time required for the vapors to pass through the reaction zone. For example, a contact time of 1 to 3 seconds will be suitable at temperatures in the neighborhood of 500° C., whereas at temperatures near 1000° C. the contact time should be very short, of the order of 0.01 second or even less. The most favorable temperature for pyrolysis is within the range from 700 to 800° C., at a contact time of about 0.1 to 0.5 second.

The pressure at which the pyrolysis is carried out is not critical, pressures ranging from a few microns of mercury to atmospheric or even superatmospheric being operable. In general, it is preferred to use low pressures, e. g., pressures of less than 50 mm. of mercury, in order to remove the reaction products from the reaction zone as rapidly as possible so that formation of undesirable by-products is minimized.

The 2,3-dicarbomethoxy-1,3-butadiene which forms during the pyrolysis can be separated from the unchanged starting material and by-products simply by fractional distillation, since it is distillable with only moderate loss through polymerization. Further purification can be effected, if desired, by freezing at or slightly above 0° C. and removing the liquid portions, since 2,3-dicarbomethoxy-1,3-butadiene melts at 16–18° C.

Polymerization of the monomeric 2,3-dicarbomethoxy-1,3-butadiene, or copolymerization thereof with other addition polymerizable ethylenically unsaturated monomers, e. g., vinyl acetate, styrene, ethyl acrylate, butadiene, methyl methacrylate, acrylonitrile, chloroprene, fluoroprene, and vinyl chloride can be effected by the known methods such as bulk, solution, emulsion or granular polymerization, with the help of the known polymerization catalysts, e. g., benzoyl peroxide, $\alpha,\alpha'$-azodiisobutyronitrile. The polymers are of molecular weight of 5000 or more.

The following examples in which parts are by weight are illustrative of the invention.

*Example I*

A mixture of 200 parts of 4-cyclohexene-1,2-dicarboxylic anhydride and 3 parts of powdered 10% palladium-on-charcoal catalyst was stirred at 170–176° C. for six hours. The mixture was then suspended in diethyl ether and filtered to remove the catalyst, and the ether was evaporated. The residue was recrystallized from a 2:1 hexane-benzene mixture, giving 120 parts of 1-cyclohexene-1,2-dicarboxylic anhydride melting at 67–70° C. The anhydride was esterified with methanol, using p-toluenesulfonic acid as the catalyst, to give dimethyl 1-cyclohexene-1,2-dicarboxylate, B. P. 75° C. at 0.2 mm. pressure, $n_D^{25}$ 1.4850.

Dimethyl 1-cyclohexene-1,2-dicarboxylate was pyrolyzed by passing it through an electrically heated tube, 1 inch in diameter, made of borosilicate glass containing about 96% combined silica, and filled with ¼ inch quartz rings. The temperature was 750° C., the pressure was 10 mm. of mercury and the average contact time was 0.12 second. The pyrolyzate was collected in a trap cooled to −78° C. and containing a little phenothiazine to inhibit polymerization. It was then distilled through an efficient fractionating column, collecting among others the fraction boiling at 35–50° C. at 0.15 mm. pressure as the crude dimethyl 1,3-butadiene-2,3-dicarboxylate, obtained with a conversion of about 10% per pass. This material, which melted between −10 and 0° C., was refractionated through an efficient column to give a purer product, B. P. 40° C. at 0.1 mm. pressure, M. P. 3–12° C. Dimethyl 1,3-butadiene-2,3-dicarboxylate of high purity was obtained by removing the liquid fractions from the product at 16° C., thus giving a product melting at 16–18° C., $n_D^{25}$ 1.4620.

*Analysis.*—Calculated for $C_8H_{10}O_4$: C, 56.46%; H, 5.92%. Found: C, 56.55%, 56.17; H, 6.13%, 6.02.

When the polymerization inhibitor is omitted during the distillation, polymerization of dimethyl 1,3-butadiene-2,3-dicarboxylate takes place to some extent. There is left in the flask a highly viscous residue which becomes rubbery on cooling. On dissolving this material in acetone, precipitating with methanol and repeating this operation one or more times, there is obtained a straw-colored solid having the composition of polymerized dimethyl 1,3-butadiene-2,3-dicarboxylate.

*Analysis.*—Calculated for $(C_8H_{10}O_4)_x$: C, 56.46%; H, 5.92%. Found: C, 57.37%, 57.15; H, 6.07%, 6.05.

*Example II*

This example describes a simplified and preferred mode of operation which avoids isolating the intermediates.

A mixture of 760 parts of 4-cyclohexene-1,2-dicarboxylic anhydride and 4 parts of 10% palladium-on-charcoal catalyst was heated 20 hours at 170–175° C. The crude 1-cyclohexene-1,2-dicarboxylic anhydride was dissolved in methanol, filtered to remove the catalyst, and esterified by heating with p-toluenesulfonic acid catalyst. The resulting ester was distilled without fractionation at 90–110° C. at 1 mm. pressure and the distillate, which contained about 75% of dimethyl 1-cyclohexene-1,2-dicarboxylate, was directly pyrolyzed by the procedure of Example I.

*Example III*

Seven parts of dimethyl 1,3-butadiene-2,3-dicarboxylate of intermediate purity (B. P. 41° C. at 0.1 mm. pressure, $n_D^{25}$ 1.4717) was added to a solution of 0.5 part of technical sodium lauryl sulfate, 0.05 part of potassium persulfate and 0.02 part of sodium bisulfite in 40 parts of deoxygenated distilled water. The dispersion was agitated under nitrogen for 6 hours at 40° C., after which another 0.05 part portion of potassium persulfate was added and the dispersion was again agitated for 6 hours at 50° C. under nitrogen. The dispersion was then broken by addition of methanol. There was thus obtained about 2 parts of polymerized dimethyl 1,3-butadiene-2,3-dicarboxylate, which was dissolved in benzene and reprecipitated by addition of methanol. The solid polymer, after drying, was pressed at 100° C. to give a colorless, transparent, flexible and orientable film, which became rubbery and elastic at about 50° C. The polymer in solution may be used as a coating composition and as a source of threads by spinning or of films by casting.

In comparison, a sample of the isomeric dimethyl muconate gave no polymer whatever when subjected to identical polymerization conditions.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of 2,3-dicarbomethoxy-1,3-butadiene wherein dimethyl 1-cyclohexene-1,2-dicarboxylate is pyrolyzed by heating the same to a temperature within the range from 500° C. to 1000° C. and the 2,3-dicarbomethoxy-1,3-butadiene is separated from the pyrolysis products.

2. Process of claim 1 wherein the pyrolysis temperature is 700° C.–800° C.

3. Process for the preparation of 2,3-dicarbomethoxy-1,3-butadiene wherein dimethyl 1-cyclohexene-1,2-dicarboxylate is pyrolyzed by bringing the same in contact, at reduced pressures, with an inert solid heat-transfer material heated to 500–1000° C. and isolating the 2,3-dicarbomethoxy-1,3-butadiene from the reaction products.

4. Process of claim 3 wherein the pyrolysis temperature is 700–800° C.

(References on following page)

References Cited in the file of this patent

UNITED STATES PATENTS

| | | |
|---|---|---|
| 2,251,298 | Soday | Aug. 5, 1941 |
| 2,480,892 | Westfahl | Sept. 6, 1949 |
| 2,587,558 | Westfahl et al. | Feb. 26, 1952 |
| 2,680,713 | Lindsey et al. | June 8, 1954 |

FOREIGN PATENTS

| | | |
|---|---|---|
| 800,227 | Germany | Oct. 17, 1950 |
| 801,396 | Germany | Jan. 1, 1951 |

OTHER REFERENCES

Beilstein, 4th edition (1920), vol. 2, p. 805.

Chem. Abstracts, Decennial Index, vol. 31–41 (1937–1946), page 6032, vol. 44, page 12304 (Subject index) and page 8328a.

Beilstein, 4th edition, vol. 2, second supplement, (1942) p. 672.

Grant: Hackh's Chemical Dictionary, McGraw edition (1944), page 359, see "fulgenic acids."